(12) United States Patent
Kim et al.

(10) Patent No.: US 11,034,268 B2
(45) Date of Patent: Jun. 15, 2021

(54) IN-VEHICLE BED ASSEMBLY

(71) Applicant: Faraday & Future Inc., Gardena, CA (US)

(72) Inventors: Richard S. Kim, Los Angeles, CA (US); Pontus Anthony Fontaeus, Newport Beach, CA (US); Leonard Konrad Wozniak, Los Angeles, CA (US); Claudio Carbone, Los Angeles, CA (US); Juergen W. Sauer, Denkendorf OT Gelbelsee (DE); Jared L. Gargano, Costa Mesa, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 16/559,580

(22) Filed: Sep. 3, 2019

(65) Prior Publication Data

US 2019/0389338 A1    Dec. 26, 2019

Related U.S. Application Data

(63) Continuation of application No. 15/721,370, filed on Sep. 29, 2017, now abandoned.

(60) Provisional application No. 62/402,259, filed on Sep. 30, 2016.

(51) Int. Cl.
   *B60N 2/34*    (2006.01)
(52) U.S. Cl.
   CPC ..................... *B60N 2/34* (2013.01)
(58) Field of Classification Search
   CPC .... B60N 2/34; B64D 11/0639; B64D 11/0641

USPC ................... 297/118, 341, 342, 343, 354.13
See application file for complete search history.

(56) References Cited

U.S. PATENT DOCUMENTS

| | | | | | |
|---|---|---|---|---|---|
| 2,320,614 | A | * | 6/1943 | Kleine | B60N 2/34 297/118 X |
| 3,202,453 | A | * | 8/1965 | Richards | B60N 2/3011 297/342 X |
| 3,427,072 | A | * | 2/1969 | Hale | A61G 15/02 297/342 X |
| 4,018,166 | A | * | 4/1977 | Gutridge | B61D 1/08 297/343 X |
| 4,221,428 | A | * | 9/1980 | Bowman | A47C 3/029 297/118 X |
| 4,495,887 | A | * | 1/1985 | Mondrush | A47C 17/161 297/118 |
| 5,628,547 | A | * | 5/1997 | Matsumiya | B60N 2/242 297/342 X |
| 5,722,726 | A | * | 3/1998 | Matsumiya | B60N 2/242 297/341 X |

(Continued)

FOREIGN PATENT DOCUMENTS

| | | | | |
|---|---|---|---|---|
| DE | 3213442 A1 | * | 10/1983 | ........... A47C 17/165 |
| EP | 298184 A1 | * | 1/1989 | ......... A47C 17/2076 |
| EP | 1097864 A1 | * | 5/2001 | ............. B60N 2/995 |

*Primary Examiner* — Rodney B White
(74) *Attorney, Agent, or Firm* — Veros Legal Solutions LLP

(57) ABSTRACT

An in-vehicle bed assembly includes a passenger seat having a seat cushion and an extendable leg rest, and a movable ottoman positioned in front of the passenger seat. When the leg rest extends from the passenger seat, the seat cushion, the extended leg rest, and the ottoman form a substantially flat surface for an occupant to lie in a horizontal position.

18 Claims, 10 Drawing Sheets

(56) References Cited

U.S. PATENT DOCUMENTS

| | | | | |
|---|---|---|---|---|
| 5,779,310 A * | 7/1998 | Suskey | A47C 17/2073 | 297/118 |
| 5,857,745 A * | 1/1999 | Matsumiya | B60N 2/34 | 297/118 X |
| 5,947,559 A * | 9/1999 | Williams | A47C 17/134 | 297/342 X |
| 5,954,401 A * | 9/1999 | Koch | B60N 2/242 | 297/354.13 X |
| 6,209,956 B1 * | 4/2001 | Dryburgh | A47C 1/0352 | 297/354.13 X |
| 6,305,644 B1 * | 10/2001 | Beroth | B64D 11/00 | 297/354.13 X |
| 6,352,309 B1 * | 3/2002 | Beroth | B64D 11/06 | 297/354.13 |
| 6,367,873 B1 * | 4/2002 | Domer | A47C 17/161 | 297/118 X |
| 6,412,870 B1 * | 7/2002 | Higgins | B60N 2/34 | 297/342 |
| 6,588,837 B1 * | 7/2003 | Schultz | A47C 17/165 | 297/118 X |
| 6,692,069 B2 * | 2/2004 | Beroth | A47C 1/0352 | 297/118 X |
| 6,739,651 B1 * | 5/2004 | Barefoot | A47C 17/161 | 297/118 X |
| 7,229,118 B2 * | 6/2007 | Saberan | B60N 2/0224 | 297/341 X |
| 7,318,622 B2 * | 1/2008 | Rezag | B64D 11/06 | 297/118 |
| 7,419,214 B2 * | 9/2008 | Plant | B64D 11/0606 | 297/354.13 X |
| 7,469,861 B2 * | 12/2008 | Ferry | B60N 2/206 | 244/118.6 |
| 7,472,957 B2 * | 1/2009 | Ferry | B60N 2/206 | 297/343 X |
| 7,523,888 B2 * | 4/2009 | Ferry | B60N 2/206 | 297/354.13 X |
| 7,533,930 B1 * | 5/2009 | Fissette | B60N 2/01 | 297/118 |
| 7,837,259 B2 * | 11/2010 | Staab | B64D 11/06 | 297/118 X |
| 8,303,036 B2 * | 11/2012 | Hankinson | B64D 11/06 | 297/342 X |
| 8,414,076 B2 * | 4/2013 | Plant | B64D 11/0641 | 297/354.13 |
| 8,419,123 B2 * | 4/2013 | Hankinson | B64D 11/06 | 297/118 |
| 8,517,466 B1 * | 8/2013 | Wizorek | B63B 29/04 | 297/118 X |
| 8,579,375 B2 * | 11/2013 | Marais | B64D 11/06 | 297/341 |
| 8,616,643 B2 * | 12/2013 | Darbyshire | B64D 11/06 | 297/341 X |
| 8,876,202 B2 * | 11/2014 | Olliges | B64D 11/0604 | 297/341 X |
| 8,931,834 B2 * | 1/2015 | Wallace | A47C 17/12 | 297/118 |
| 9,022,320 B2 * | 5/2015 | Wallace | B64D 11/0604 | 244/118.6 |
| 2001/0000639 A1 * | 5/2001 | Park | A47C 1/0352 | 297/354.13 X |
| 2007/0246981 A1 * | 10/2007 | Plant | B64D 11/064 | 297/248 |
| 2009/0066121 A1 * | 3/2009 | Jacob | A47C 15/00 | 297/118 |
| 2009/0146005 A1 * | 6/2009 | Bettell | B64D 11/064 | 244/118.6 |
| 2009/0302158 A1 * | 12/2009 | Darbyshire | B64D 11/06 | 244/118.6 |
| 2012/0146372 A1 * | 6/2012 | Ferry | B64D 11/06 | 297/232 |
| 2012/0153687 A1 * | 6/2012 | Kume | A61G 5/1067 | 297/118 |
| 2012/0169093 A1 * | 7/2012 | Kume | A61G 5/04 | 297/118 |
| 2013/0113250 A1 * | 5/2013 | Udriste | B64D 11/06395 | 297/217.3 |
| 2013/0241247 A1 * | 9/2013 | Wallace | B64D 11/06 | 297/118 |
| 2014/0191541 A1 * | 7/2014 | Ohta | A61G 5/04 | 297/118 |
| 2014/0210235 A1 * | 7/2014 | Ferry | B60N 2/206 | 297/118 |
| 2015/0130244 A1 * | 5/2015 | Wyss | B64D 11/0601 | 297/354.13 |
| 2015/0274301 A1 * | 10/2015 | Udriste | B64D 11/0641 | 297/354.11 X |
| 2017/0015423 A1 * | 1/2017 | Udriste | B60N 2/34 | |
| 2017/0259921 A1 * | 9/2017 | Valdes De La Garza | B64D 11/0638 | |
| 2017/0327232 A1 * | 11/2017 | Morgan | B64D 11/0604 | |
| 2020/0238880 A1 * | 7/2020 | Valdes De La Garza | B60N 3/063 | |

* cited by examiner

IN-VEHICLE BED ASSEMBLY

CROSS-REFERENCE TO RELATED APPLICATIONS

This application is a continuation of U.S. patent application Ser. No. 15/721,370, filed Sep. 29, 2017, and claims the benefit of U.S. Provisional Application No. 62/402,259, filed Sep. 30, 2016, the entirety of which are hereby incorporated by reference.

TECHNICAL FIELD

The present disclosure is generally related to adjustable and reclining in-vehicle seats. In particular, the present disclosure provides adjustable and reclining in-vehicle seats to be used as a bed or a recliner seat.

BACKGROUND

Many vehicles provide reclining seats that allow occupants to recline at an angled, but relatively upright position when wishing to relax or rest more comfortably in the seats. While reclining to an angled position does provide some form of greater relaxed comfort compared to sitting in an upright position, the greatest mode of comfort is often experienced when lying down in a fully reclined and horizontal position with the feet elevated and the body substantially parallel to the ground.

However, passenger seats in current vehicles cannot fully recline so that the occupant may fully lie down flat on his or her back with the legs comfortably elevated from the ground. Moreover, in conventional vehicles, once an occupant reclines his or her seat, there is insufficient space in the front area of the cabin that allows for the occupant's feet to be elevated without hitting the dashboard compartment. Thus, passenger seats in current vehicles do not allow the occupant's body to be comfortably positioned in a fully horizontal state.

BRIEF SUMMARY OF THE DISCLOSURE

The present disclosure provides an in-vehicle bed assembly that can be used as a bed for an occupant to lie down in a horizontal position. In some embodiments, the in-vehicle bed assembly includes a passenger seat having a seat cushion and a movable ottoman positioned in front of the passenger seat. The seat cushion and the ottoman form at least a part of a substantially flat surface for an occupant to lie in a horizontal position.

In some other embodiments, an in-vehicle bed assembly includes a passenger seat having a seat cushion, a movable ottoman positioned in front of the passenger seat, a mattress, and a roller storage attached to the mattress and configured to roll the mattress into a compact form for storage. The mattress is configured to be placed over the seat cushion and the ottoman to provide a flat surface for the occupant to lie on.

According to some further embodiments, an in-vehicle bed assembly includes a passenger seat having a seat cushion, a movable ottoman positioned in front of the passenger seat, a platform and an arm having a first end and a second end, the first end being attached to the platform and the second end being rotatably attached to the ottoman, and a mattress having one end configured to be attached to the platform and another end configured to be attached to a front end of the ottoman. The arm is rotatable between a first position and a second position. In the first position, the arm extends forward and the platform is placed against a front end of the ottoman, and in the second position, the arm extends backward and the platform is placed on the seat cushion to cover a slope of the seat cushion to provide a flat surface in conjunction with the seat cushion. When the arm is in the second position, the mattress extends from the front end of the ottoman to the seat cushion.

The present disclosure also provides a foldable car seat in a vehicle. In some embodiments, the foldable car seat includes a seat platform and a back support rotatably coupled to the seat platform. The back support is configured to fold forward to touch an upper surface of the seat platform to form an ottoman.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The details of some exemplary embodiments of the methods and systems of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Various embodiments of the present disclosure relate to adjustable vehicle seats configured with one or more components that may be repositioned to form an in-vehicle bed assembly (or part of an in-vehicle bed assembly) to allow an occupant to lie down in a fully reclined and horizontal position relative to the ground. In other embodiments, the adjustable passenger seats may provide the occupant the option of sitting in one or more reclined positions at varied angles, so as to give the occupant a wide range of seating selections that can be easily adjusted according to the occupant's desire of comfort.

Figure 1A:
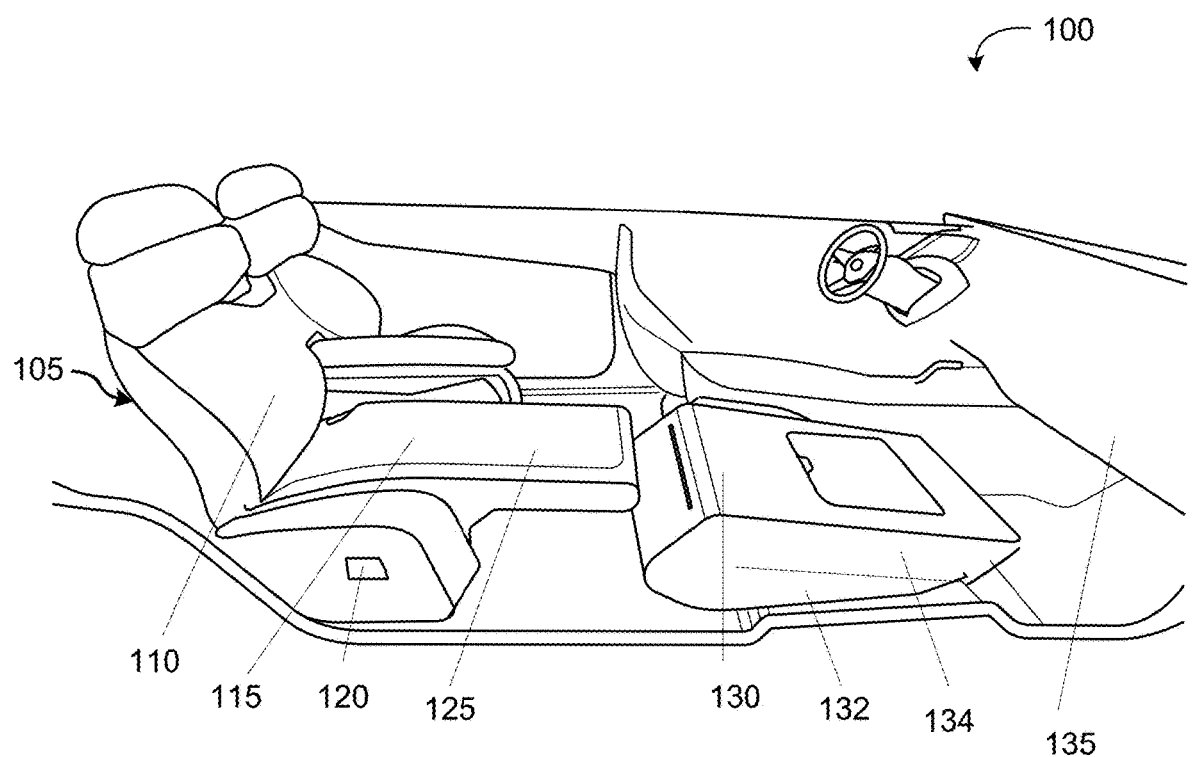
FIG. 1A illustrates an integrated in-vehicle bed assembly according to one embodiment of the present disclosure.

FIG. 1 illustrates an exemplary integrated in-vehicle bed assembly 100 according to one embodiment. The integrated in-vehicle bed assembly 100 may include a rear passenger seat 105 and an ottoman 130. The passenger seat 105 and the ottoman 130 form at least a part of a substantially flat surface that allows an occupant to lie down in a fully reclined and horizontal position so as to comfortably sleep or relax within the confines of the vehicle cabin. The rear passenger seat 105 may include a rear passenger seat cushion 115. As illustrated, the rear passenger seat 105 may be configured to be used as the supporting platform to one end of the in-vehicle bed assembly 100, and the ottoman 130 is used as the supporting platform to the other end of the in-vehicle bed assembly 100. By way of example only, the rear passenger seat cushion 115 may be the area where the occupant's head is placed when the occupant wishes to lie down on the in-vehicle bed assembly 100. Additionally, the ottoman 130 may be configured to provide a substantially horizontal surface (i.e. the surface facing upward), which may be used as a foot rest to allow the occupant to place his or her legs on the surface of the ottoman 130. In some instances, the features described herein in connection with the ottoman 130 may be provided by a customized front passenger seat configured to display the same or similar features of the ottoman 130 as described herein (e.g. by folding the front passenger seat all the way forward such that the back surface of the front passenger seat provides a level surface facing substantially upward). For example, as shown in FIG. 1A, the front passenger seat may include a seat platform 132 and a back support 134. The seat platform 132 and the back support 134 are rotatably coupled together. The back support 134 can fold forward to touch an upper surface of the seat platform 132. In this folded form, the front passenger seat constructs the ottoman 130.

In order for the occupant's body to be fully supported by the rear passenger seat 105 and the ottoman 130 when lying down on the in-vehicle bed assembly 100, the rear passenger seat 105 may also include an extendable leg rest 125 coupled thereto. With the push of an automatic button (not shown here) or the pulling/pushing of a mechanical lever (not shown here), or by any mechanism known in the art, the extendable leg rest 125 may extend outward from the rear passenger seat 105 such that the extendable leg rest 125 bridges the gap (entirely or partially) between the rear passenger seat cushion 115 and the ottoman 130. The mechanical controls for the extendable leg rest 125 may be located on the side of the rear passenger seat 105, as indicated by reference number 120, or on the ottoman, a passenger door, or any other part of the vehicle. In some instances, the extendable leg rest 125 may be controlled and/or operated from a wireless device application (e.g. via an application on a smartphone). The extendable leg rest 125 may be utilized to provide sufficient back/body support when the occupant is lying down on the in-vehicle bed assembly 100.

With the extendable leg rest 125 in an extended position, the extendable leg rest 125 may be coupled or otherwise abutted next to the ottoman 130 so as to lessen or eliminate any gaps or space in between the extendable leg rest 125 and the ottoman 130, as depicted in FIG. 1. To help eliminate the presence of such gaps in some instances, the ottoman 130 may be movable and adjustably positioned closer to the rear passenger seat 105 and/or the extendable leg rest 125 in the extended position. For example, the ottoman 130 may be placed on a roller track (not shown) so that the occupant is able to move the ottoman 130 forward and backward manually or automatically (e.g. in some instances, using a mechanism similar to or the same as that employed in connection with passenger seats that may be adjusted forward or backward). In another example, the rear passenger seat 105 may also be placed on a roller track (now shown) so that the rear passenger seat 105 also moves forward and backward, which may also be used to further help create or eliminate the presence of the gap between the extendable leg rest 125 and the ottoman 130. This adjustment feature enabling a user to move the rear passenger seat 105 and the ottoman 130 closer or father apart from one another may be used to achieve optimal custom configurations for various occupants, which may be dependent upon an occupant's body frame and height. For example, an occupant with a smaller frame and height may adjust the extendable leg rest 125 and the ottoman 130 much closer to one another so that the surface of the rear passenger seat 105 and the surface of the ottoman 130 provide a stable platform to support the occupant's body in the horizontal position. However, for another occupant with a much larger frame and height, the rear passenger seat 105 and the ottoman 130 may be pushed far away from one another so as to ensure that the ottoman 130 is located where the occupant's legs and feet rest will be resting when lying down. In these and other exemplary embodiments, whether the extendable leg rest 125 completely or entirely bridges the area between the passenger seat 105 and the ottoman 130 (i.e. the gap), the extendable leg support may provide added support in at least a portion of the area between the passenger seat 105 and the ottoman 130.

In some embodiments, the rear passenger seat cushion 115 may not include the extendable leg rest 125. However, the gap between the rear passenger seat cushion 115 and the ottoman 130 may be eliminated with the use of a plank or board (not shown here). The plank or board may be made of any rigid material, such as hard plastic, wood, metal, or composite material, or any combination of the same. In some embodiments, the plank or board may be made of a compressible foam or be air-inflatable, or a combination of a compressible foam and an air-inflatable plastic container. The plank or board may be folded and stored/concealed, for example, within an interior cavity within the ottoman 130 (as will be described in further detail below). One end of such a plank or board, when unfolded, may attach to a portion of the ottoman 130 (e.g. the edge of the ottoman 130 nearest to the rear seat cushion 115) while the other end of the plank or board may attach to a portion of the rear passenger seat cushion 115 (e.g. the edge of the seat cushion nearest to the ottoman 130). However, as discussed above, in some instances, the rear passenger seat 105 and the ottoman 130 may be pushed far away from one another so as to ensure that the ottoman 130 is located where the occupant's legs and/or feet will be resting when lying down, which may be particularly true for larger and/or taller occupants. Thus, even in the instances where the rear passenger seat cushion 115 has an extendable leg rest 125, the ottoman 130 may be pushed to the front most area of the cabin as possible, which may result in the ottoman 130 being situated partially underneath dashboard compartment 135. In such an embodiment, there may be a relatively large gap between the extendable leg rest 125 and the ottoman 130. In such instances, one or more planks or boards may be placed on the edges of extendable leg rest 125 and the ottoman 130 to eliminate the gap, thus providing greater support to the in-vehicle bed assembly 100.

Figure 1B:
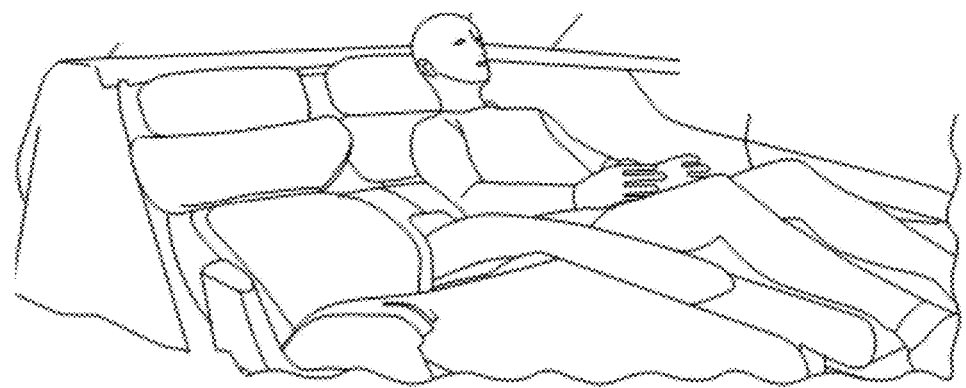
FIG. 1B illustrates an exemplary reclining car seat according to one embodiment of the present disclosure.

In other instances, the in-vehicle bed assembly 100 may not utilize an ottoman 130 for the support of the occupant's legs and feet. Instead, the ottoman 130 may be pushed all the way towards the forward section of the cabin so that it is tucked underneath the dashboard compartment 135. The rear passenger seat 105 may also be moved more towards the front part of the cabin so that there is enough space in the back area of the vehicle to accommodate the reclining of the rear passenger seat 105, as depicted in FIG. 1B.

In some instances, the rear passenger seat 105 may be moved substantially towards the front of the cabin so that the head and back support 110 of the rear passenger seat 105 may be fully reclined to a horizontal position. By way of example only, the extendable leg rest 125 may also be extended from the rear passenger seat cushion 115, thus allowing the occupant to lie down in a fully reclined and horizontal position with his or feet elevated from the floor and supported by the extendable leg rest 125.

In other instances, the occupant may not wish to lie down, but instead, would rather sit in an upright position with his or her feet elevated to relatively the same height as the rear passenger seat cushion 115. In such instances, the occupant may sit in the rear passenger seat 105 with the extendable leg rest 125 out in the extended position. In other embodiments, the ottoman 130 may be pushed all the way back so that the edge of the ottoman 130 couples or abuts against the edge of the rear passenger seat 105, where the extendable leg rest 125 need not be utilized. However, for occupants who have exceptionally long legs and the extendable leg rest 125 alone does not provide substantial support to the occupant's feet and legs, the occupant may sit in the rear passenger seat 105 with the extendable leg rest 125 in the extended position and the ottoman 130 coupled or abutted against the edge of the extendable leg rest 125 so that the occupant's feet and legs may be supported and elevated.

If the occupant wishes to have the legs elevated higher than the rear passenger seat 105, the occupant may adjust the angle and/or height of the ottoman 130 such that the ottoman 130 surface may take on an angle (relative to the level plane) anywhere from 1 degree to 90 degrees. In such an instance, the occupant's legs and feet may take on an angle pose when resting on the angled surface of the angled ottoman 130. As such, the occupant may control the angle of the ottoman 130 surface based on his or her selected preference. An occupant may engage this feature in any manner, such as with the mechanical control located on the rear passenger seat 105, as indicated at 120, or with a mechanical control located on the side (or other portion) of the ottoman 130, or any automatic or wirelessly controlled mechanism known in the art.

Figure 2:
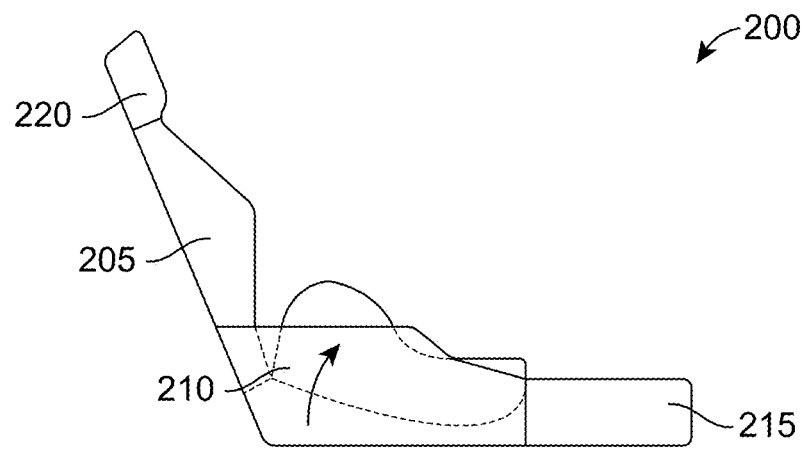
FIG. 2 illustrates an exemplary reclining car seat with an attached leg rest and an adjustable seat cushion according to one embodiment of the present disclosure.

FIG. 2 illustrates another exemplary car seat 200. In the instance that the seat cushion 210 is to be used as the head rest (or, in some embodiments, to support a separate head rest structure, as further described in detail below) for the integrated in-vehicle bed assembly, the seat cushion 210 may be adapted to pivot, so as to tilt upward. For example, the occupant may wish to tilt the seat cushion 210 upward because car seats 200 often characteristically have a sloped seated area, which may otherwise cause the occupant's head to tilt down when placed on the seat cushion 210. When the head is resting at such a tilted position, discomfort to the occupant's neck and back is likely to result. In some embodiments, by pivoting/adjusting the seat cushion 210 upward and forward, the seat cushion 210 can be made to correct for the otherwise uncomfortable downward slope of the seat cushion 210. In some embodiments, the seat cushion 210 may be adjusted such that it provides a level surface (i.e. creating a plane that substantially matches the plane of the surface of the ottoman and/or an extendable leg rest 215) upon which a user may rest his or her head. In other embodiments, by pivoting the seat cushion 210 forward, the seat cushion 210 may be adjusted such that it provides a head support piece that is tilted slightly forward/upward rather than backward/downward. The seat cushion 210 may be securely locked in its pivoted position via a latching system that anchors the seat cushion in its pivoted configuration. Other types of fasteners or locking mechanisms as appreciated by one of ordinary skill in the art upon reading this disclosure may be used, such as clamps, hooks, padlocks, and the like. The seat control for the car seat 200 can be configured to control the seat cushion to tilt. In some other embodiments, a manual control, e.g., a lever, may be provided, to allow the occupant to manually control the tilt of the seat cushion 210.

In further embodiments, the exemplary reclining car seat 200 may include the extendable leg rest 215 so as to provide the necessary support for the occupant's body when lying down on the reclining car seat 200 with the occupant's head placed on the seat cushion 210.

In other instances, the occupant may rather wish to sit in an upright or reclined position with his or her back supported by the back rest 205 of the car seat 200. In that particular instance, the occupant's head will be rested on the head rest 220 rather than the seat cushion 210.

Figure 3:
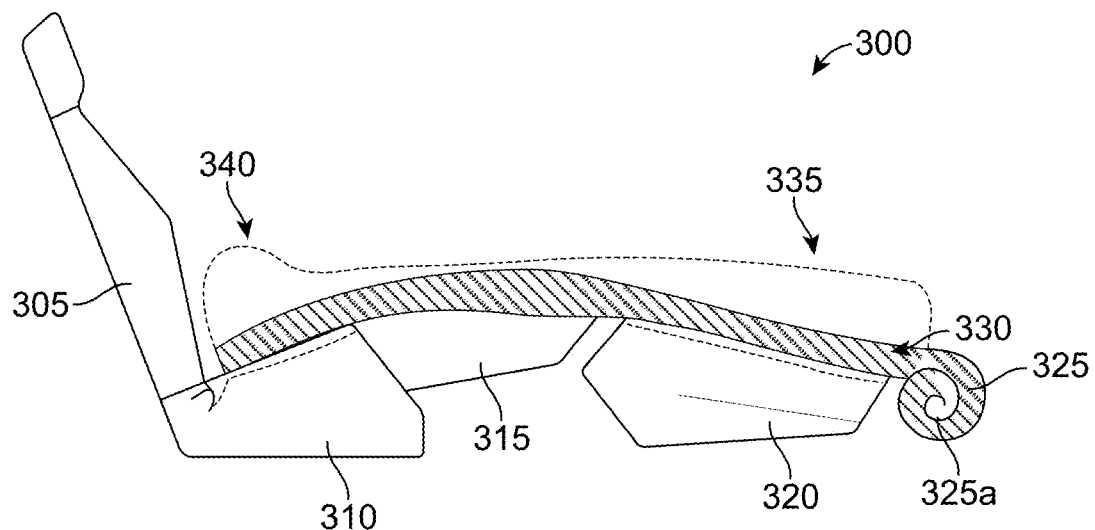
FIG. 3 illustrates an exemplary integrated in-vehicle bed with a pad mattress according to one embodiment of the present disclosure.

FIG. 3 illustrates an exemplary integrated in-vehicle bed assembly 300 including pad mattress 330 according to one embodiment. In such embodiments, the rear passenger seat 305 may include an extendable leg rest 315. When in the extended position, the extendable leg rest 315 may be substantially parallel to the ground (i.e. level). In some embodiments, the extendable leg rest 315 may be configured to extend outward at varying degrees in accordance to the occupant's preference.

In further embodiments, the exemplary integrated in-vehicle bed assembly 300 includes an ottoman 320. In accordance with this particular set-up or configuration, the occupant's head may be placed and/or supported by the seat cushion 310, the upper body and torso supported by the extendable leg rest 315, and the legs and feet supported by the ottoman 320, thus allowing the occupant to comfortably lie down in a fully reclined position in the vehicle. In some embodiments, while the use of the seat cushion 310 as the head rest area and the use of the ottoman 320 as the leg and foot rest attempts to place the occupant in the most horizontal and comfortable position as possible, the ergonomics of the seat cushion 310 may be slightly titled, making the overall shape of the top surface of the seat cushion 310, extended leg rest 315, and the ottoman 320 somewhat curved. Both the extendable leg rest 315 and the ottoman 320 may be made of relatively hard surfaces, making the integrated in-vehicle bed 300 uncomfortable to lie upon. Thus, in order to enhance the overall comfort of the occupant when lying down in a fully reclined position, a pad mattress 330 may be deployed in the in-vehicle bed 300 system to give extra cushioned support, while also providing an even flatter and horizontal platform surface for the occupant to lie upon.

In a particular embodiment, the pad mattress 330 may be made of high density foam so that the pad mattress 330 may be capable of being both expandable and highly compressible, which may be ideal for storing the pad mattress 330 in narrow and relatively small storage areas. In some embodiments, the pad mattress 330 may be an air mattress or a combination of both an air mattress and a foam mattress. In other instances, the pad mattress 330 may be made of latex foam, memory foam, cotton, wool, synthetic batting, and the like. Thus, when the pad mattress 330 is laid out for use, the pad mattress 330 may take shape as the foam rises or air is filled in, as highlighted and indicated at 335 and 340.

In some embodiments, the underside of the pad mattress 330 may be configured to, in an uncompressed state, substantially match a curvilinear profile of the surface created by seat cushion 310, the extendable leg rest 315, and/or the ottoman 320, while the top side of mattress 330 may be configured to, in an uncompressed state, remain substantially flat and/or level.

In some embodiments, when the pad mattress 330 is not in use, the pad mattress 330 may be stored by rolling the pad mattress 330 through a roller storage 325 configured to roll the pad mattress 330 neatly and tightly in compact form around a hollow cylinder 325a (or other elongate component, not necessarily hollow and/or cylindrical). The hollow cylinder 325a of the roller storage 325 may be placed on a roller storage holder, which may be a long slender shaft so as to allow the roller storage holder 325 to spin around the axis of the shaft when unrolling and pulling the pad mattress over the surface of the seat cushion 310, extendable leg rest 325, and the ottoman 320. In some embodiments, roller storage 325 may be located within or beneath ottoman 320 such that the roller storage and mattress are hidden when not in use. By way of example only, the roller storage 325 may include a crank (not shown here) so that the occupant may manually unroll the pad mattress 330 over the seat cushion 310, extendable leg rest 325, and the ottoman 320, and roll the pad mattress 330 back onto the roller storage 325. In other instances, the roller storage 325 may be automated so that with a press of a button, the mechanical components either automatically release the pad mattress 330 from the axis of the roller storage 325 or automatically roll the pad mattress 330 back onto the axis of the roller storage 325. When the pad mattress 330 is not in use, the pad mattress may be rolled onto the roller storage holder 325 and then placed in any appropriate storage compartments within the vehicle 300.

In other instances, the pad mattress 330 may not be stored on a roller storage holder 325 altogether. Instead, the pad mattress 330 may be foldable and stored at various storage units located within the cabin of the vehicle 300.

Figure 6:
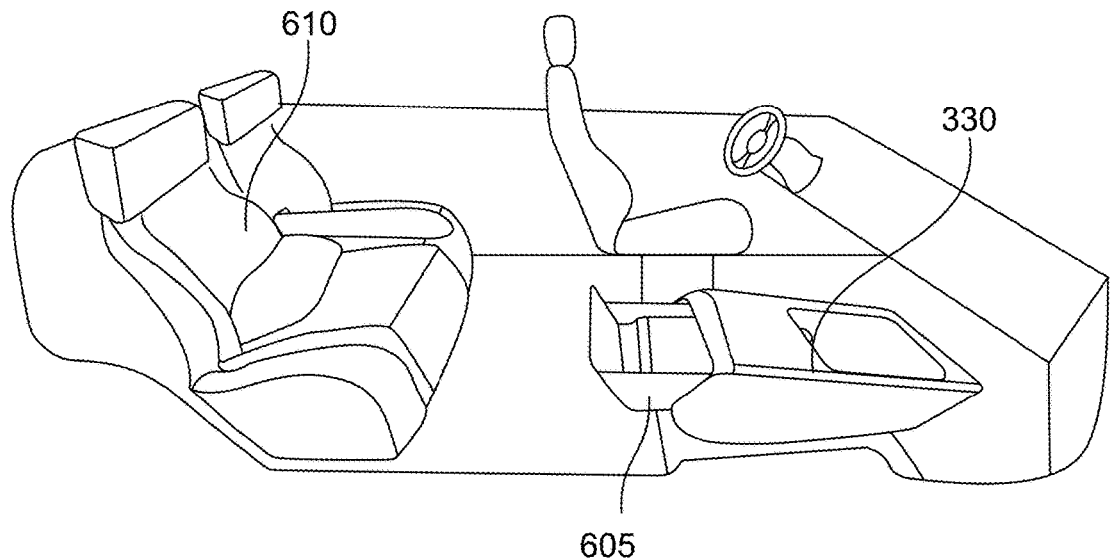
FIG. 6 illustrates an exemplary storage unit located within the ottoman according to one embodiment of the present disclosure.

The ottoman 320 may have a storage space inside the ottoman 320 or beneath the ottoman 320. The pad mattress 330 (and the roller storage holder 325 if any) can be stored in the storage space of the ottoman 320. By way of example only, the ottoman 330 may have a storage unit 605, which may be implemented as a drawer, as depicted in FIG. 6. In FIG. 6, the storage unit 605 may be readily accessible to the occupant sitting in the rear passenger seat 610 by pulling out the storage unit 605 from the ottoman 320.

Referring back to FIG. 3, in the instance that the pad mattress 330 is unrolled over the seat cushion 310, extendable leg rest 315, and the ottoman 320, the pad mattress 330 may be securely placed in position by anchoring the pad mattress 330 to the rear passenger seat 305 (or a strap or latch coupled thereto) via a latching system. The pad mattress 330 may be anchored onto the rear passenger seat using latches, hooks, clasps, buttons, Velcro, zippers, and the like to ensure that the pad mattress 330 does not fall or slide off of the rear passenger seat. Additionally, the pad mattress 330 may also be anchored onto the ottoman 320 so that the pad mattress 330 does not slip or fall off of the ottoman 320. Some examples of anchoring the pad mattress 330 onto the ottoman 320 may include using seat belt latches, hooks, clasps, buttons, Velcro, zippers, and the like.

By way of another example only, the pad mattress 320 may be anchored onto the rear passenger seat 305 by engaging with the seatbelt. That is, in some embodiments, pad mattress 320 may be configured with a male and/or female seat belt buckle. As such, the female seat belt buckle on the pad mattress 330 is inserted into the corresponding male seat belt buckle located at/near the seat cushion 310, and the male seat belt latch on the pad mattress 330 is inserted into the corresponding female seat belt latch located at/near the seat cushion 310. As another example, the pad mattress 330 may have hooks that can be anchored onto the hooks on the rear seat that are normally used to secure a child car seat.

Figure 4:
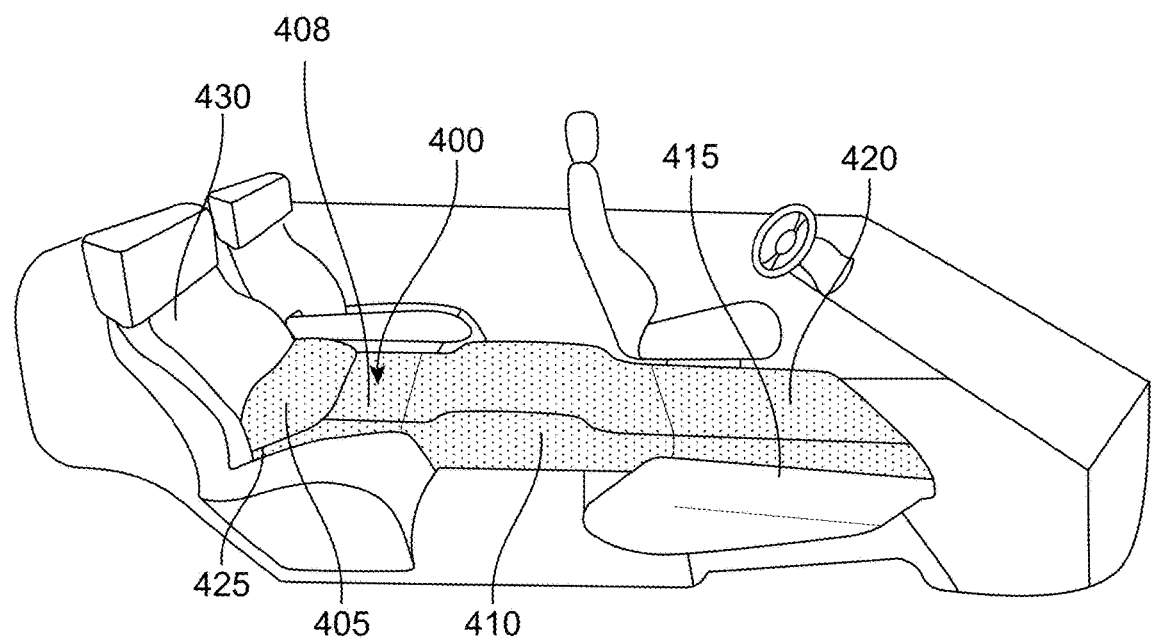
FIG. 4 illustrates an exemplary integrated in-vehicle bed with a pad mattress according to one embodiment of the present disclosure.

The underside of the pad mattress 330 in contact with the surface of the seat cushion 305, leg rest 315, and the ottoman 320 may be configured to match the profile of the surface of the seat cushion 305, leg rest 315, and the ottoman 320. The opposite surface of the pad mattress 330 may be configured to have a completely or substantially flat and horizontal level surface, as depicted in FIG. 4. In other instances, the pad mattress 330 may be relatively flat, but have a raised portion 340 near one end of the pad mattress 330, which may be used as a pillow or headrest support. Thus, in the instance that the pad mattress 330 is made of highly dense foam, the raised portion 340 may simply have more cushion and padding at one end of the pad mattress 330. In other instances, a separate component that may be attached and detached from the pad mattress 330 may be provided to serve as a pillow. In the instance that the pad mattress 330 is an air mattress or a combination of air and foam mattress, the inflow of air into the pad mattress 330 may form the raised portion 340.

FIG. 4 illustrates an exemplary foldable pad mattress 400 supported by a seat cushion 425 of a rear passenger seat 430 and an ottoman 415 according to one embodiment. In this particular embodiment, the foldable pad mattress 400 is foldable in at least three parts instead of being rolled around a roller storage as described above with respect to FIG. 3. However, it should be noted that the foldable pad mattress 400 is not limited to being folded in three parts, and may contain any number of foldable partitions.

Referring back to FIG. 4, the foldable pad mattress 400 may include an upper body portion 408, a middle body portion 410, and a lower body portion 420. The upper body portion 408 may be supported by the seat cushion 425 of the rear passenger seat 430. The lower body portion 420 of the foldable pad mattress 400 may be supported by the ottoman 415. To further ensure the upper body portion 408 of the foldable pad mattress 400 is level and stably situated on the rear passenger seat 430, the profile of the underside of the upper body portion 408 over the rear passenger seat 430 may substantially match the profile of the rear passenger seat 430. Additionally, to also ensure that the lower body portion 420 of the foldable pad mattress 400 is level and stably situated on the ottoman 415, the profile of the underside of the lower body portion 420 may substantially match the profile of the surface of the ottoman 415.

In some embodiments, the middle body portion 410 of the foldable pad mattress 400 may include a hard bottom surface or structure that bridges across the seat cushion 425 and the ottoman 415 as shown in FIG. 4, so that the middle body portion 410 can provide sufficient support to the weight of an adult occupant. In this particular example, the middle body portion 410 may not be supported by anything underneath.

In some embodiments, the rear seat 430 may include an extendable leg rest as shown in FIG. 3 and other figures. The middle body portion 410 of the foldable pad mattress 400 may be supported by the extended leg rest, or supported by all of the seat cushion 425, the extended leg rest, and the ottoman 415. In this embodiment, the profile of the underside of the middle body portion 410 may match the profile of the upper surface of the extendable leg rest.

In some other embodiments, the middle portion 410 of the foldable pad mattress 400 may be supported by one or more planks underneath. The underside of the middle portion 410 of the foldable pad mattress 400 may match a surface profile of the plank, so that the foldable pad mattress 400 may be fitted onto the plank.

In further embodiments, the foldable pad mattress 400 may have a pillow 405 to provide additional neck support when the occupant lies down on the foldable pad mattress 400. The pillow 405 may be attached and detached from the foldable pad mattress 400; while in other instances, the pillow 405 may be permanently attached to the foldable pad mattress 400.

The foldable pad mattress 400 may be made of highly dense foam, thus allowing the foldable pad mattress 400 to be tightly compressed into small storage areas and to immediately expand when unfolded and removed from the storage area. In other instances, the foldable pad mattress 400 may also be an air mattress or a combination of both an air mattress with highly dense foam, so that the foldable pad mattress 400 may gain its shape when an inflow of air is provided into the foldable pad mattress 400.

Figure 5:
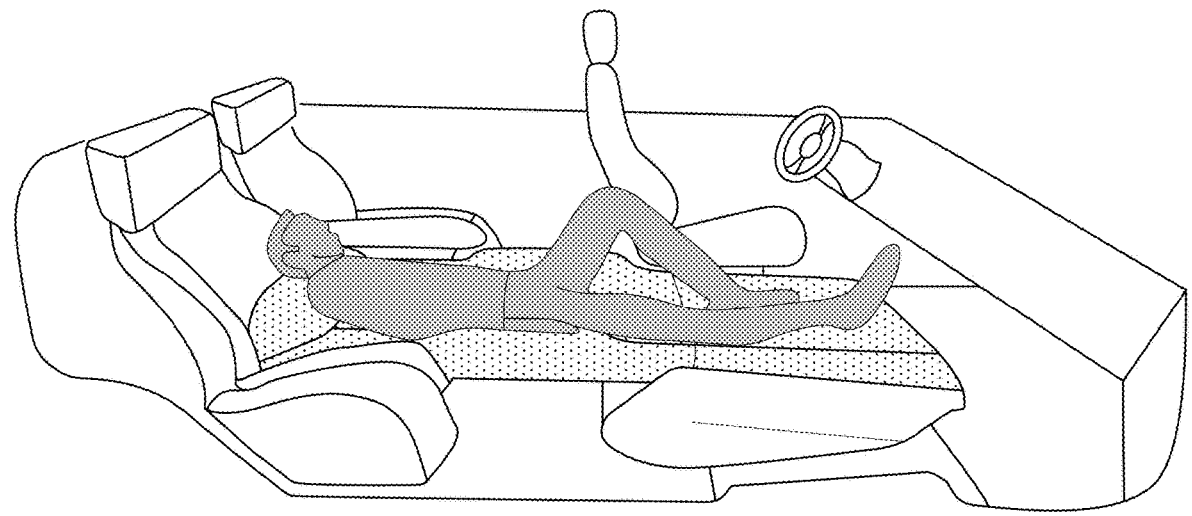
FIG. 5 illustrates an exemplary integrated in-vehicle bed with a pad mattress according to one embodiment of the present disclosure.

Once the foldable pad mattress 400 is laid out onto at least the seat cushion 425 and the ottoman 415, an occupant may lie down on the foldable pad mattress 400 in a level orientation (or substantially level orientation), as depicted in FIG. 5.

FIG. 6 illustrates an exemplary storage unit 605 located within the ottoman 330 according to one embodiment. The storage unit 605 may be a drawer that can be pulled out from the ottoman 330, as shown in FIG. 6. As briefly discussed above, the storage unit 605 may be used to store the pad mattress when not in use. Additionally, the storage unit 605 may be used to store other accessories used to assemble the integrated in-vehicle bed, such as planks, pillows, blankets, and the like. However, it should be noted that the storage unit 605 is not strictly limited to storing accessories for the integrated in-vehicle bed, and instead, may be used to store any items.

Figure 7:
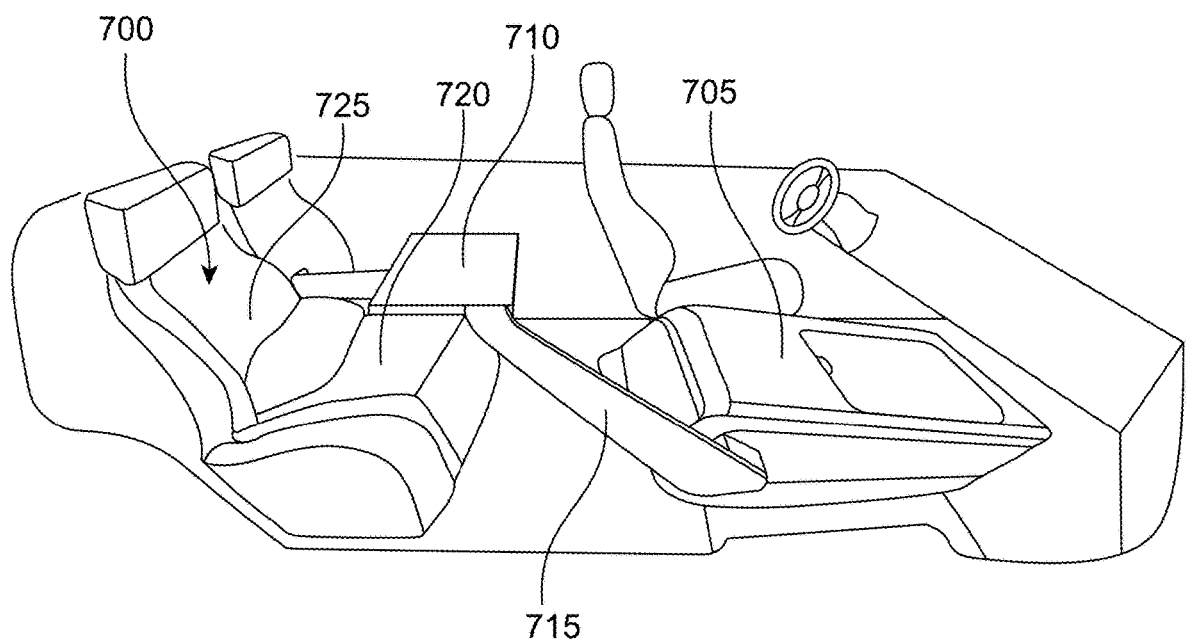
FIG. 7 illustrates an exemplary platform located within the ottoman according to one embodiment of the present disclosure.

FIG. 7 illustrates an exemplary platform 710 coupled to or located within the ottoman 705 according to one embodiment. In one particular embodiment, the platform 710 may be attached to an arm 715 that may be rotated back towards the rear passenger seat and locked at an angled position so that the platform 710 may be used as a personal desk or tray. In another embodiment, the arm 715 that may be rotated forward to an angled position close to the dashboard compartment and locked there, so that a front seat passenger may use the platform 710 as a desk or tray. The arm 715 may be extendable, so that the platform 710 can reach a far front or a far back position.

Figure 8A:
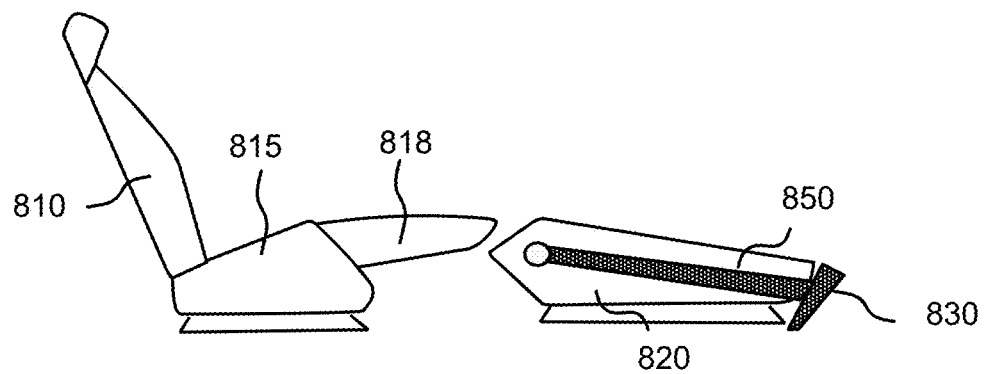
FIG. 8A illustrates an exemplary platform stored underneath an ottoman according to one embodiment of the technology disclosed herein.

FIGS. 8A, B, C, and D illustrate another embodiment of an in-vehicle bed assembly according to the present disclosure. As shown in FIG. 8A, the bed assembly may include a rear passenger seat 810 having a seat cushion 815 and an extendable leg rest 818, and an ottoman 820. The bed assembly may further include an platform 830 that can be used to help create a substantially flat surface for the occupant when lying down on the in-vehicle bed assembly. The platform 830 may be attached to an arm 850, which is rotatably attached to ottoman 820. The arm 850 may be rotatable between a first (e.g., a frontmost) position and a second (e.g., a backmost) position. When the arm 850 is in the first position, the platform 830 may be placed against a frond end of the ottoman 820 to free up space when the platform 830 is not in use. The platform 830 may also be stored or tucked underneath the ottoman 820, which may completely conceal the platform 830 from plain view.

Figure 8B:
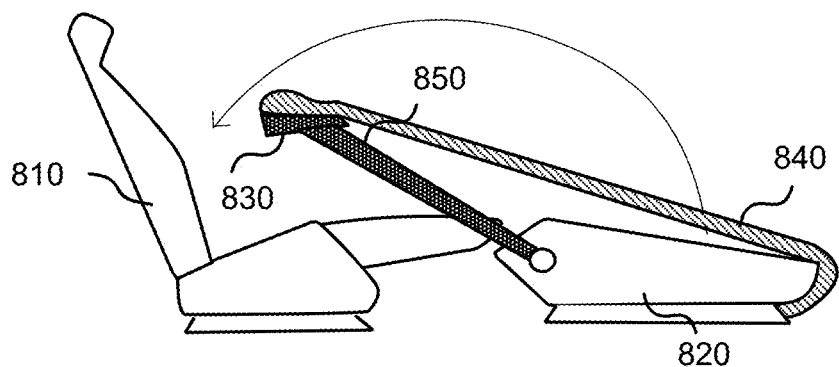
FIG. 8B illustrates an exemplary platform attached to a pad mattress according to one embodiment of the technology disclosed herein.

FIG. 8B depicts that, when the arm 850 is in the second position, the platform 830 reaches far back to the rear passenger seat 810. The platform 830 may initially be taken out of its stored area underneath the ottoman 820. In some instances, the bed assembly may further include a pad mattress 840 having one end attached to an upper side of the platform 830 and another end attached to a front end of the ottoman 820 (e.g., attached to a roller storage as described with reference to FIG. 3 above). The pad mattress 840 may be attached to the platform 830 through a coupling mechanism and is detachable from the platform 830. The coupling mechanism may include one or more of latches, hooks, clasps, buttons, Velcro, zippers, strings, and the like. Thus, as the platform 830 is being extended back, the pad mattress 840 stored within or underneath the ottoman 820 is also simultaneously released (e.g., unrolled) and placed over the ottoman 820 and the seat cushion 815 of the rear passenger seat 810. In some configurations, platform 830 can be detached from pad mattress 840 in a default state, thereby allowing a user to use the platform 830 as a table as described above, or without a mattress as discussed below with reference to FIG. 8D. In these configurations, just prior to releasing (e.g., unrolling) pad mattress 840 and while in its first (e.g., frontmost) position, platform 830 can be attached to pad mattress 840 using the coupling mechanism. Thus, once the user wishes to deploy pad mattress 840, the platform 830 can pull the pad mattress 840 over ottoman 820 and seat cushion 815 as the platform 830 is moved to its second (e.g., backmost) position. The arm 850 may be extendable, so that the platform can reach a far front and a far back position.

Figure 8C:
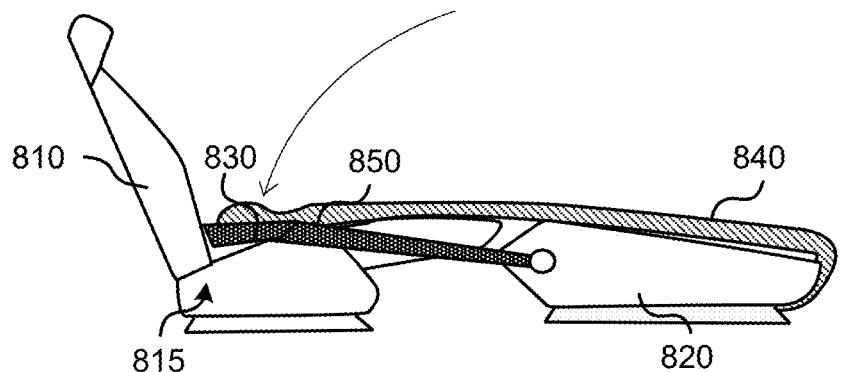
FIG. 8C illustrates an exemplary platform with a pad mattress extended back to the reclining car seat according to one embodiment of the technology disclosed herein.

As further depicted in FIG. 8C, the platform 830 may also swivel so that the surface of the platform 830 may lie flatly against the surface of a seat cushion 815 of the rear passenger seat 810 when the platform 830 is extended back. The platform 830 may reach far back so the end of the platform 830 abuts against the back support of the rear passenger seat 810. In order for the platform 830 to reach as far back, the arm 850 may be extended to various lengths in order to accommodate the shortening and lengthening of the arm 850 based on the desired use and length of the platform 830.

When the platform 830 lies flat against the seat cushion 815 of the rear passenger seat 810, the downward slope of the seat cushion 815 is eliminated. Because seat cushions 815 often characteristically have a sloped seated area, the occupant's head tilts back at an uncomfortable position and angle when the head is resting on the angled seat cushion 815. When the head is resting at such a tilted position, discomfort to the occupant's neck and back is likely to immediately result. As such, it is important that a flat and/or level platform surface is available for the occupant to lie on. Thus, the platform 830 may be used to eliminate and cover up (i.e. provide a bridge spanning over) the sloped seated area between the seat cushion 815 and the back support.

In the instance that the pad mattress 840 is connected or attached to the surface of the platform 830, the pad mattress 840 may cover the in-vehicle assembly by rotating the arm 850 from the front of the ottoman 820 to the rear passenger seat 810. This allows for the mattress pad 840 to be easily and quickly laid out in one continuous motion.

Figure 8D:
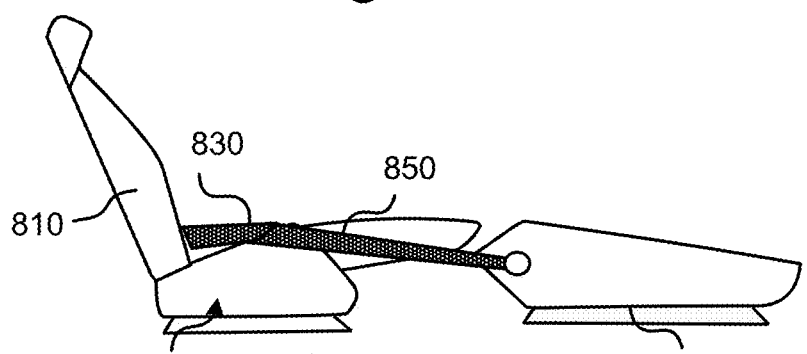
FIG. 8D illustrates an exemplary platform extended back to the reclining car seat according to one embodiment of the technology disclosed herein.

In other instances, as illustrated in FIG. 8D, a pad mattress (not shown here) may not be attached to an upper side of the platform 830, as discussed above with respect to FIG. 8B. Instead, both sides of the platform 830 may be exposed and not covered by a pad mattress when pulling the platform 830 away from the ottoman 820. Once the platform 830 is extended back in contact with the seat cushion 815, the occupant may then choose to lie on the assembled in-vehicle bed as is or take a separate pad mattress out and lay it on the assembled in-vehicle bed. The pad mattress may be securely held onto the assembled in-vehicle bed with a latching mechanism or other fastening devices as discussed above.

FIGS. 9A-D illustrate an exemplary integrated in-vehicle bed assembly 900 formed by a rear passenger seat 905 and an ottoman 920 according to one embodiment of the technology disclosed herein. The rear passenger seat 905 may include a seat cushion 915 and an extendable leg rest 910 extending from the seat cushion 915. The extendable leg rest 910 may pivot upward and outward so as to be along the same surface plane level as the seat cushion 915. Because a gap between the edge of the extendable leg rest 910 and the edge of the ottoman 920 may still remain even with the extendable leg rest 910 fully extended out, some sort of platform may be needed to eliminate the gap in order to provide a sufficient supporting structure or platform that allows an occupant to comfortably and safely lie on the in-vehicle bed assembly 900.

To eliminate the presence of the gap, an extendable platform structure may be unfolded from within the ottoman 920. In some embodiments, the ottoman 920 includes an ottoman cover 925 (also called extendable platform 925), which unfolds out when needed to provide a stable platform or base to the in-vehicle bed assembly 900 so that an occupant may lie down in a fully reclined and horizontal position within the confines of the vehicle cabin. Additionally, the ottoman 920 may have a hollow interior, which may provide a storage compartment 935. In some instances, a mattress 930 may be rolled and stored within the ottoman storage compartment 935.

As shown in FIGS. 9A-9D, the ottoman cover 925 is pivotally connected to the ottoman 920 by, e.g., one or more hinges. The ottoman cover 925 may include three sections: a top panel 940, a middle panel 942, and an end panel 945. The top panel 940 and the middle panel 942 are connected by one or more hinges. The end panel 945 is received in a slot of the middle panel 942 or can be retracted to a place below the middle panel 942. The end panel 945 can extend out to cover the storage compartment 935 when the ottoman cover 925 is lifted up and unfolded from the ottoman 920.

Figure 9A:
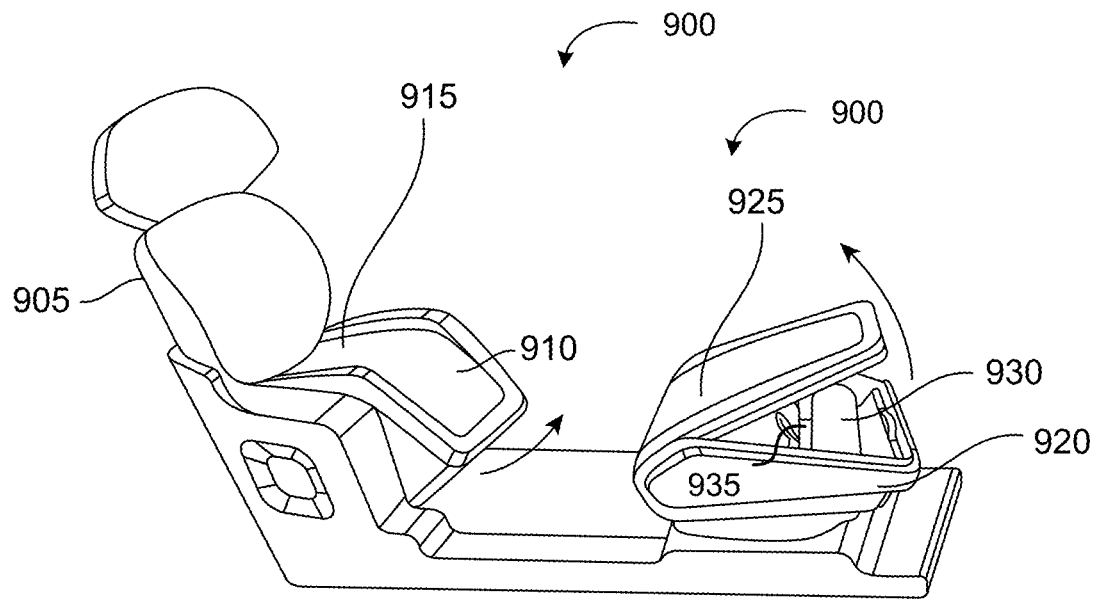
FIG. 9A illustrates an exemplary platform partially folded out from an ottoman according to one embodiment of the technology disclosed herein.
Figure 9B:
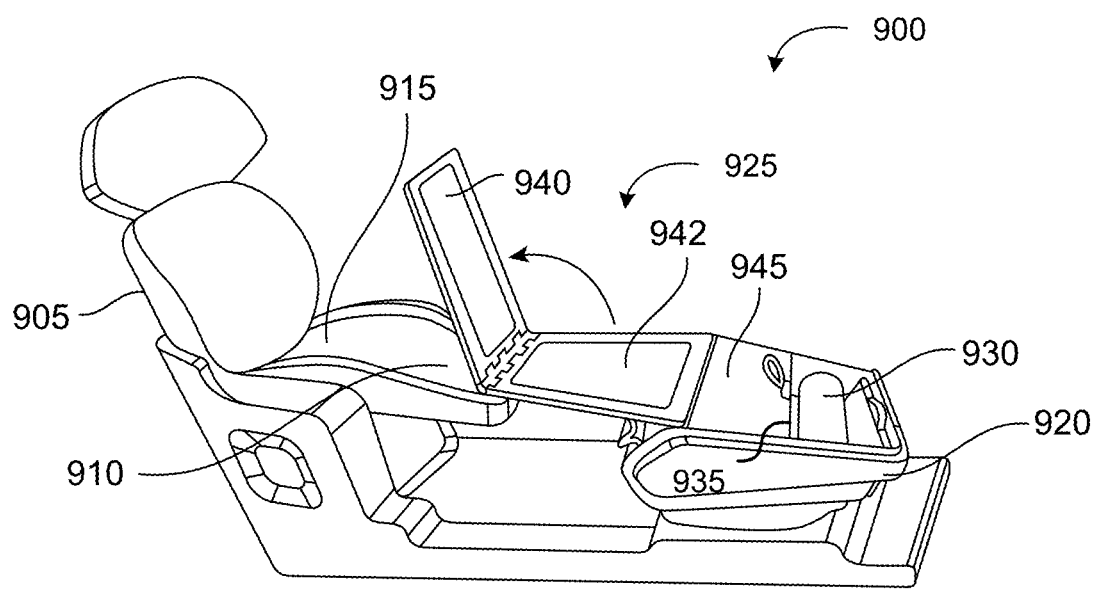
FIG. 9B illustrates the exemplary platform partially unfolded from the ottoman according to one embodiment of the technology disclosed herein.
Figure 9C:
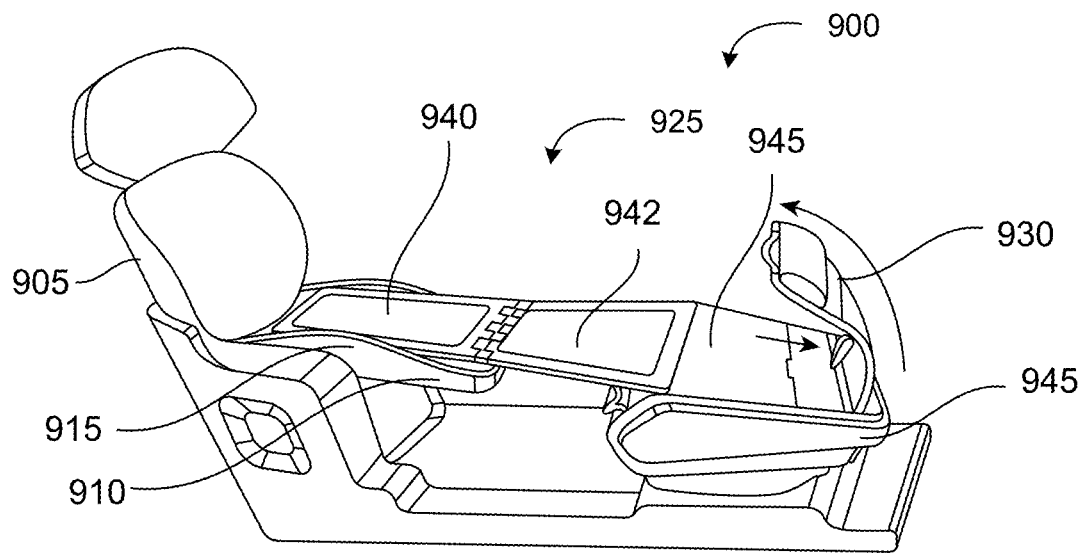
FIG. 9C illustrates the exemplary platform unfolded from the ottoman and a mattress partially pulled out from within the ottoman and onto the platform according to one embodiment of the technology disclosed herein.

FIG. 9B illustrates an exemplary integrated in-vehicle bed assembly 900 with the ottoman cover 925 partially extended and unfolded according to one embodiment of the technology disclosed herein. Here, the ottoman top cover 925 may be extended back towards the rear passenger seat 905 so that the gap between the extendable leg rest 910 and the ottoman 920 is eliminated. Additionally, the top panel 940 attached to the ottoman top cover 925 may be unfolded and placed on top of the extendable leg rest 910 and seat cushion 915. As shown in FIGS. 9B and 9C, placing the additional top panel 940 on the seat cushion 915 provides a substantially flat surface for the occupant's upper body area and head when the occupant is fully reclined in a horizontal position on the in-vehicle bed assembly 900. Once a flat platform surface is laid out with the use of the ottoman cover 925, the mattress 930 is ready to be rolled out, as illustrated in FIG. 9C.

In FIG. 9C, the mattress 930 may be pulled out from within the ottoman 920 according to one embodiment of the technology disclosed herein. As illustrated, the mattress 930 stored in the ottoman storage compartment 935 may be pulled out to cover the entire platform area created from the ottoman cover 925. Additionally, in some embodiments, the end panel 945 may be pulled out to cover the ottoman compartment area 935 when the ottoman cover 925 is unfolded out to form part of the platform. Thus, the fully extendable platform of the in-vehicle bed assembly 900 may include the top panel 940, the middle panel 942, and the end panel 945 so that an occupant may lie down in a fully reclined and horizontal position on the in-vehicle bed assembly 900.

In some other instances, the extendable platform of the in-vehicle bed assembly may include the end panel 945 and the middle panel 942 when unfolded from the ottoman 920, such that the top panel 940 is not included. In this particular example, the seat cushion 915 may be used to support the upper body of the occupant. The seat cushion 915, together with the two segments of the ottoman cover 925, forms the platform.

Figure 9D:
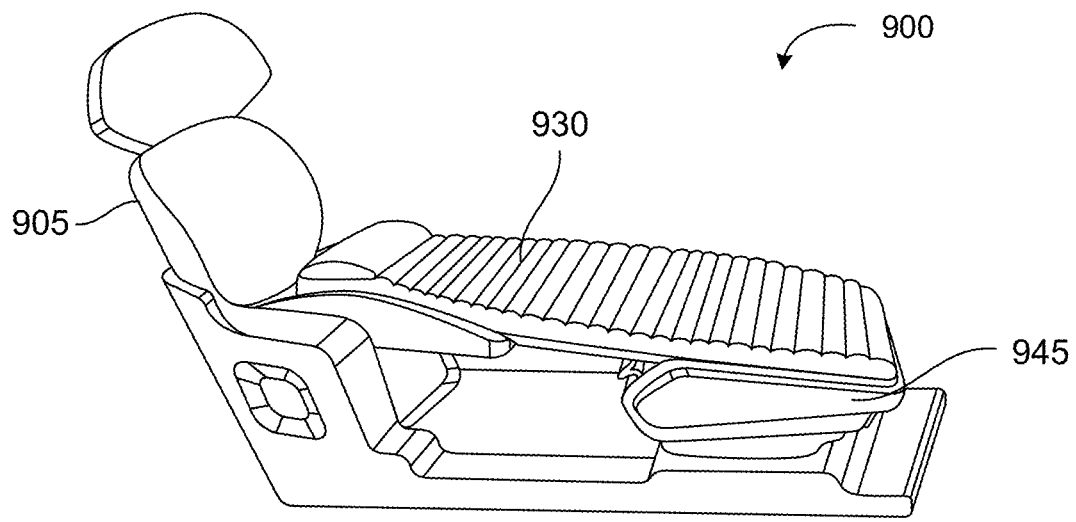
FIG. 9D illustrates an exemplary mattress fully pulled out from within the ottoman and onto the platform according to one embodiment of the technology disclosed herein.

In FIG. 9D, a mattress 930 may be fully pulled out from within the ottoman 920 according to one embodiment of the technology disclosed herein. Once fully pulled out from the ottoman 920, the mattress 930 may be securely attached to the platform or the passenger seat 905, as described above with respect of FIG. 3.

Figure 10A:
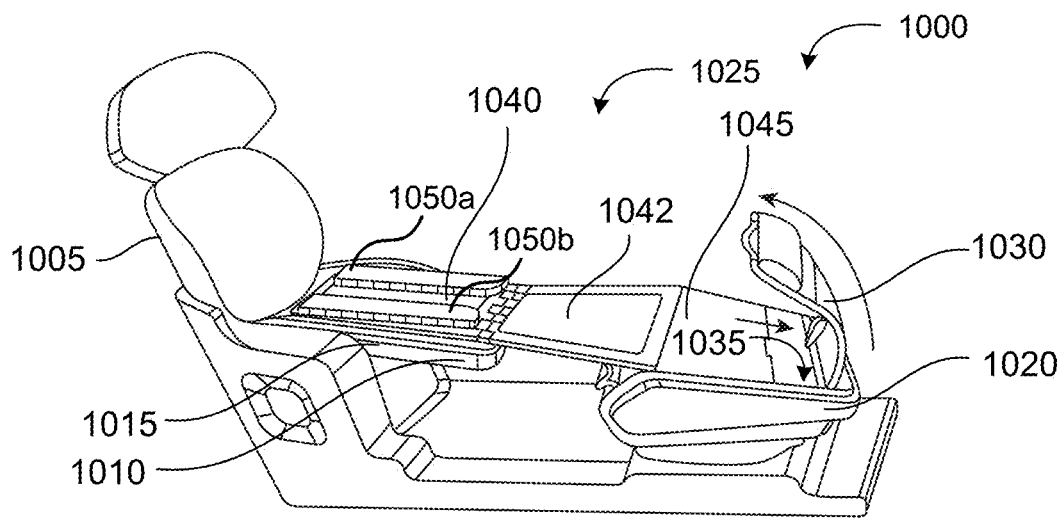
FIG. 10A illustrates an exemplary platform unfolded from an ottoman and a cushion partially folded according to another embodiment of the technology disclosed herein.
Figure 10B:
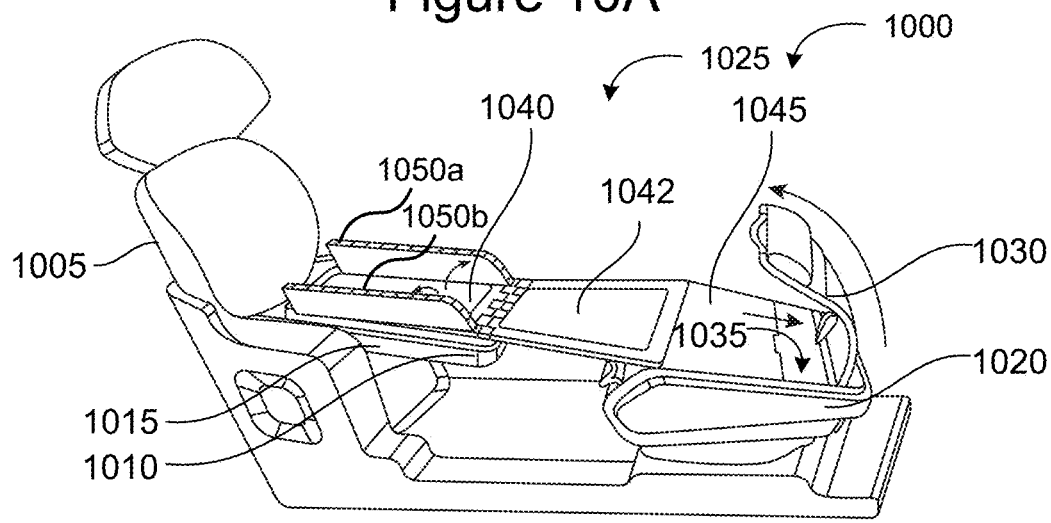
FIG. 10B illustrates the exemplary platform unfolded from the ottoman and the cushion partially folded according to one embodiment of the technology disclosed herein.
Figure 10C:
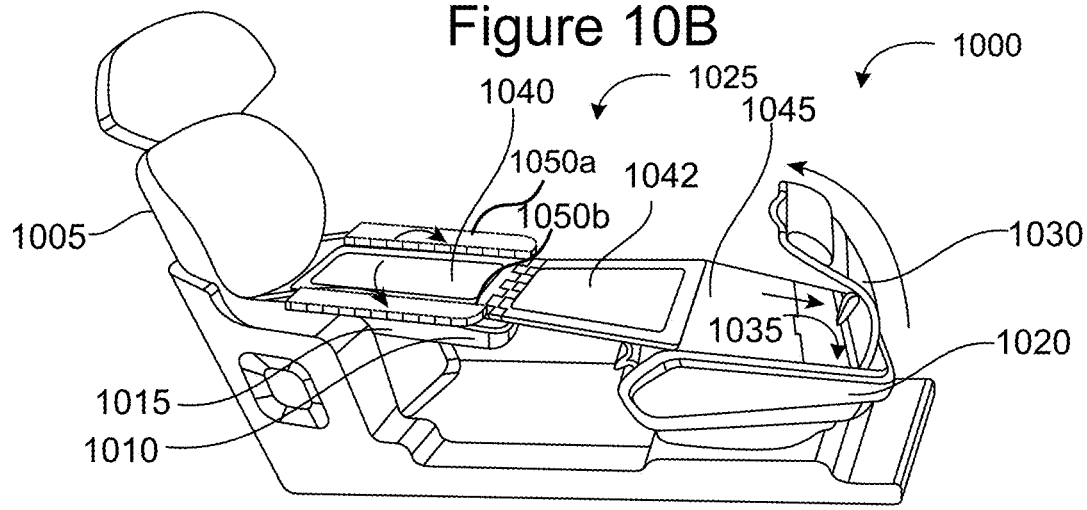
FIG. 10C illustrates the exemplary platform unfolded from the ottoman and the cushion folded according to one embodiment of the technology disclosed herein.

FIGS. 10A, 10B, and 10C illustrates an exemplary extendable platform 1025 unfolded from an ottoman 1020 onto a rear seat 1005 according to one embodiment of the technology disclosed herein. The rear seat 1005 may include a seat cushion 1015 and extendable leg rest 1010. Similar to FIGS. 9A-9C, the extendable platform 1025 of the in-vehicle bed assembly 1000 includes a top panel 1040, a middle panel 1042, and an end panel 1045. As shown in the figures, in some embodiments, to allow the extendable platform 1025 be folded within the ottoman 1020, the top panel 1040 may be narrower than the middle panel 1042. To fill in the space by the two sides of the top panel 1040, the extendable platform 1025 may include two side segments 1050*a*, 1050*b* placed on top of the top panel 1040. The two side segments 1050*a* and 1050*b* may be connected to two side edges of the top panel 1040. When not in use or when the top panel 1040 is stored within the ottoman 1020, the side segments 1050*a*, 1050*b* may be folded on the top of the top panel 1040 as shown in FIG. 10A.

FIG. 10B illustrates the side segments 1050*a*, 1050*b* unfolding outward when the top panel 1040 is unfolded and placed on the seat cushion 1015 and the extendable leg rest 1010. FIG. 10C illustrates the side segments 1050*a*, 1050*b* completely unfolded and placed by the two side edges of the top panel 1040, against the surface of the seat cushion 1015 and the extendable leg rest 1010. After the side segments 1050*a* and 1050*b* are unfolded to the two sides of the top panel 1040, the two side segments 1050*a*, 1050*b*, and the top panel 1040 form a wider flat surface to accommodate an occupant's upper body. The mattress 1030 may then be pulled out from within a storage compartment 1035 of the ottoman 1020 and placed over the extendable platform 1025.

The side segments 1050*a*, 1050*b* may be used ensure that a flat surface covers most, if not all, of the rear passenger seat 1005 surface. The side segments 1050*a*, 1050*b* may be made of material such as plastic, vinyl, or any other hard surface as would be appreciated by one of ordinary skill in the art. In other instances, the side segments 1050*a*, 1050*b* may be made of foam or be air-inflatable, or a combination of a compressible foam and an air-inflatable plastic container.

Figure 11:
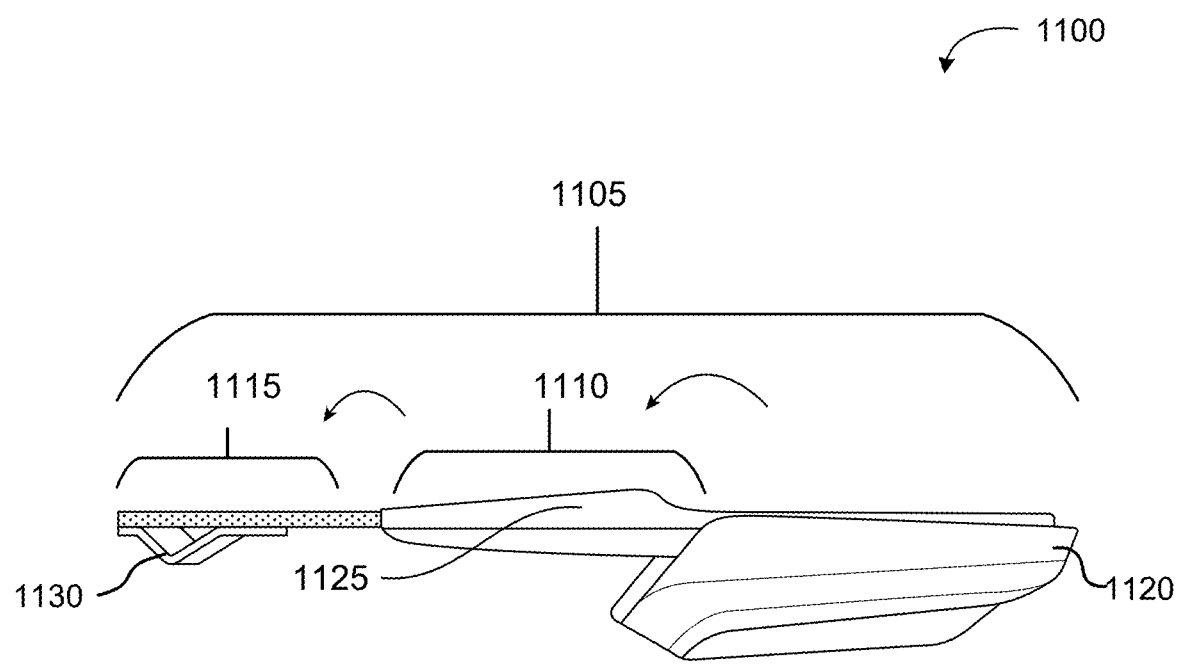
FIG. 11 illustrates an exemplary platform unfolded from an ottoman according to one embodiment of the technology disclosed herein.

FIG. 11 illustrates an exemplary extendable platform 1105 unfolded from an ottoman 1120 according to one embodiment of the technology disclosed herein. The extendable platform 1105 may include a middle panel 1110 and a top panel 1115. The top panel 1115 may include raised legs 1130 attached to a bottom surface of the top panel 1115. The raised legs 1130 may be used to compensate for the dipped or slanted surface of the seat cushion, so that the extendable platform 1105 is horizontal or raised when fully extended out from the ottoman 1120. In some instances, the raised legs 1130 may be affixed in its place and position. In other instances, the raised legs 1130 may have multiple sections connected by hinges, so that when not in use, the raised legs 1130 may be folded inward or outward onto the bottom surface of the top panel 1115. And when in use, the raised legs 1130 may be raised from the bottom surface of the top panel 1115.

In some embodiments, the in-vehicle bed assembly 1100 includes railings 1125 at each sides of the platform 1105. The railings 1125 may provide added safety by helping ensure that the occupant does not roll or fall over onto the floor of the vehicle cabin. In one example, the railings 1125 may be a solid structure that is attached to the sides of the middle panel 1110. In another example, the railings 1125 may be made of a fabric that inflates with air when the occupant wishes to use the in-vehicle bed assembly 1100. The air within the railings 1125 may deflate when the in-vehicle bed assembly 1100 is no longer in use and the platform 1105 is to be stored within the ottoman 1120. However, it should be noted that the railings 1125 may be composed of any material as would be appreciated by one of ordinary skill upon reading this disclosure, such as plastic, foam, or a combination of compressible foam and an air-inflatable plastic container.

Figures 12A, 12B:
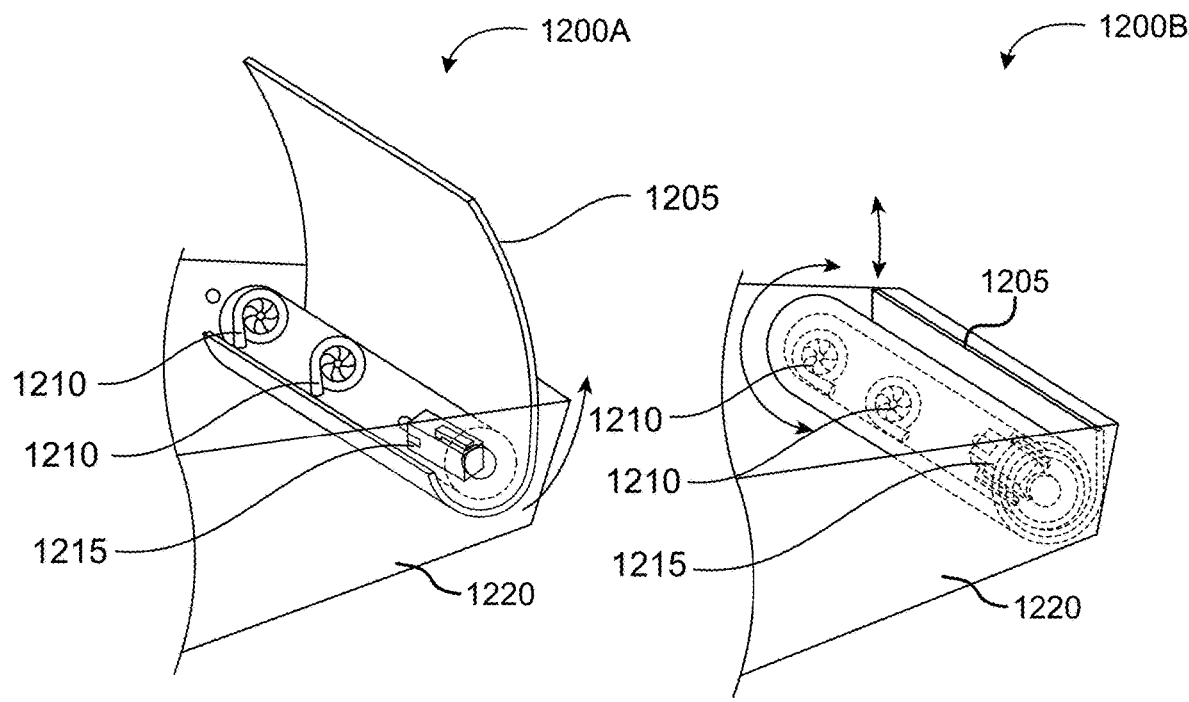
FIG. 12A illustrates an exemplary deployment of a stored mattress according to one embodiment of the technology disclosed herein.
FIG. 12B illustrates an exemplary storage of a mattress according to one embodiment of the technology disclosed herein.

FIG. 12A illustrates an exemplary deployment of a mattress 1205 stored within an ottoman 1220 according to one embodiment of the technology disclosed herein. FIG. 12B illustrates an exemplary mattress 1205 within an ottoman 1220 according to one embodiment of the technology disclosed herein. The system illustrated in FIGS. 12A and 12B and described herein can be used in the embodiments described above. As illustrated, the air mattress 1205 may be deflated and rolled within the ottoman 1220. The deflated air mattress 1205 may be rolled around an axis, in which one end of the deflated air mattress 1205 is connected to a motor 1215. As illustrated in FIG. 12A, when the deflated air mattress 1205 is ready to be pulled and extended over a platform, the motor 1215 may unroll the air mattress 1205 so that the air mattress 1205 may be placed over the platform. When the air mattress 1205 is ready to be stored within the ottoman 1220, the motor 1215 may be turned on to retract and roll the air mattress within the ottoman 1220, as illustrated in FIG. 12B. The motor 1215 may be controlled with a press of a button located anywhere within the vehicle cabin, such as the sides of the seat cushion or on the dashboard of the vehicle cabin. In other instances, the motor 1215 may also be operated from a wireless device application (e.g. via an application on a smartphone or a tablet).

Additionally, FIGS. 12A and 12B both depict an air pump 1210 attached to one end of the air mattress 1205. When powered on, the air pump 1210 may provide a stream of air to inflate the air mattress 1205. Additionally, the air pump 1210 may also deflate the air mattress 1205. The air pump 1210 may be controlled with a press of a button located anywhere within the vehicle cabin, such as the sides of the seat cushion or on the dashboard of the vehicle cabin. In other instances, the air pump 1210 may also be operated from a wireless device application (e.g. via an application on a smartphone or a tablet). In some embodiments, the air pump 1210 may be controlled together with the motor 1215. For example, when an occupant turns on the motor 1215 to unroll the air mattress 1205, the air pump 1210 is also turned on to start to inflate the air mattress 1205. When the occupant controls the motor 1215 to roll the air mattress 1205 to store it in the ottoman 1220, the air pump 1210 also starts to deflate the air mattress.

Figure 13:
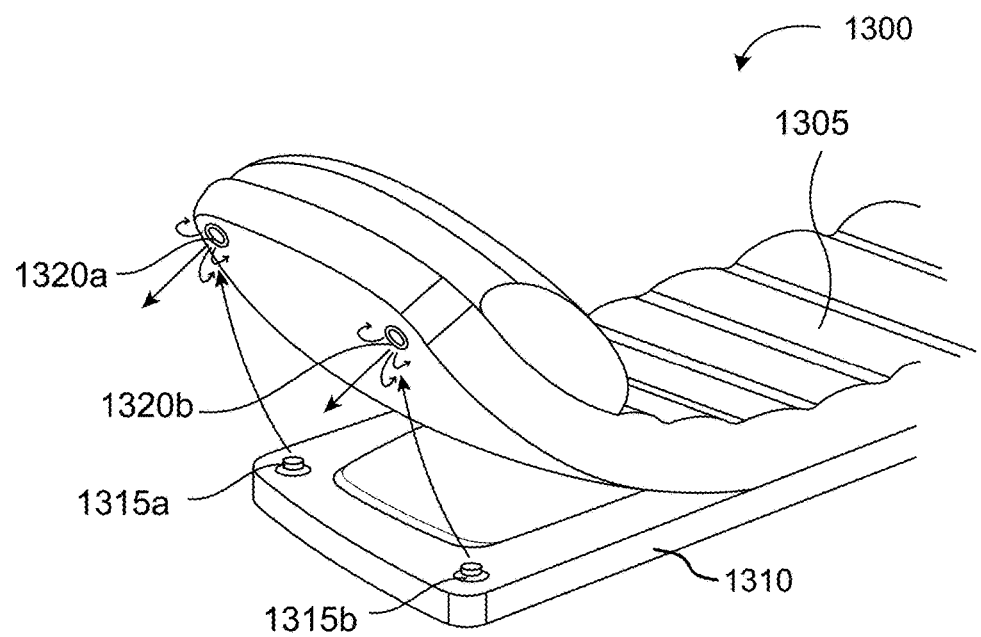
FIG. 13 illustrates an exemplary mattress attached onto a platform extended from an ottoman according to one embodiment of the technology disclosed herein.

FIG. 13 illustrates an exemplary mattress 1305 attached onto a platform 1310 extended from an ottoman according to one embodiment of the technology disclosed herein. As illustrated, the mattress 1305 may be inflated with air and may include exhaust ports 1320a, 1320b located at each corners of the mattress 1305. The exhaust ports 1320a, 1320b can be snapped into place on the platform 1310 by placing the exhaust ports 1320a, 1320b over the corresponding exhaust port receivers 1315a, 1315b.

The exhaust port receivers 1315a, 1315b allow for the mattress 1305 to be firmly positioned in place on the platform 1310. Additionally, the exhaust port receivers 1315a, 1315b may be connected to an air pump (not shown here), where the air from the air pump (not shown here) travels through the exhaust port receivers 1315a, 1315b and the exhaust ports 1320a, 1320b to inflate the mattress 1305. Additionally, when the mattress 1305 is to be deflated to be stored away, the air pump (not shown here) connected to the exhaust port receivers 1315a, 1315b may withdraw air from the mattress 1305.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An in-vehicle bed assembly comprising:
   a passenger seat having a seat cushion; and
   a movable ottoman positioned in front of the passenger seat;
   a mattress configured to be placed over the seat cushion and the ottoman to provide a flat surface for the occupant to lie on; and
   a roller storage attached to the mattress and configured to roll the mattress into a compact form for storage within a compartment area of the ottoman,
   wherein the seat cushion and the ottoman form at least a part of a substantially flat surface for an occupant to lie in a horizontal position.

2. The in-vehicle bed assembly of claim 1, wherein the seat cushion is configured to tilt upward to provide a head rest for the occupant.

3. The in-vehicle bed assembly of claim 1, wherein the passenger seat comprises a leg rest that is extendable from the passenger seat, and
   wherein when the leg rest extends from the passenger seat, where the seat cushion, the leg rest, and the ottoman form at least a part of a substantially flat surface for an occupant to lie in a horizontal position.

4. The in-vehicle bed assembly of claim 1, wherein the mattress is foldable and includes a first portion, a second portion, and a third portion, the first portion being configured to be placed on the seat cushion, the second portion being configured to bridge the seat cushion and the ottoman, and the third portion being configured to be placed on the ottoman.

5. The in-vehicle bed assembly of claim 1, further comprising a latching system that secures the mattress with the passenger seat.

6. The in-vehicle bed assembly of claim 5, wherein the latching system comprises hooks attached to an end of the mattress for latching on hooks on the passenger seat.

7. The in-vehicle bed assembly of claim 1, wherein the mattress is foldable.

8. An in-vehicle bed assembly comprising:
a passenger seat having a seat cushion; and
a movable ottoman positioned in front of the passenger seat, and
a platform and an arm having a first end and a second end, the first end being attached to the platform and the second end being rotatably attached to the ottoman,
wherein the seat cushion and the ottoman form at least a part of a substantially flat surface for an occupant to lie in a horizontal position.

9. The in-vehicle bed assembly of claim 8, wherein the arm is rotatable between a first position and a second position, and in the first position, the arm extends forward and the platform is placed against a front end of the ottoman, and in the second position, the arm extends backward and the platform is placed on the seat cushion.

10. The in-vehicle bed assembly of claim 8, wherein the arm is rotatable to an angled position where the platform provides a desk for an occupant sitting on the passenger seat and arm is lockable at the angled position.

11. The in-vehicle bed assembly of claim 8, wherein the ottoman is constructed by folding a front passenger seat.

12. The in-vehicle bed assembly of claim 11, wherein the arm is rotatable to an angled position where the platform provides a desk for an occupant sitting on the front passenger seat when it is not folded and the arm is lockable at the angled position.

13. The in-vehicle bed assembly of claim 1, wherein the ottoman comprises a foldable platform including a middle panel having one edge pivotally connected to an edge of the ottoman and a top panel pivotally connected to another edge of the middle panel.

14. The in-vehicle bed assembly of claim 13, wherein the platform further includes an end panel, which is extendable from the middle panel.

15. The in-vehicle bed assembly of claim 13, wherein the platform further includes two side segments capable of being folded on the top of the top panel and being unfolded and placed by two side edges of the top panel.

16. An in-vehicle bed assembly comprising:
a passenger seat having a seat cushion;
a movable ottoman positioned in front of the passenger seat;
a mattress;
a roller storage attached to the mattress and configured to roll the mattress into a compact form for storage, wherein the mattress is configured to be placed over the seat cushion and the ottoman to provide a flat surface for the occupant to lie on.

17. An in-vehicle bed assembly comprising:
a passenger seat having a seat cushion; a movable ottoman positioned in front of the passenger seat;
a platform and an arm having a first end and a second end, the first end being attached to the platform and the second end being rotatably attached to the ottoman; and
a mattress having one end configured to be attached to the platform and another end configured to be attached to a front end of the ottoman, wherein the arm is rotatable between a first position and a second position, and in the first position, the arm extends forward and the platform is placed in contact with the ottoman, and in the second position, the arm extends backward and the platform is placed in contact with the seat cushion to cover a slope of the seat cushion to provide a flat surface in conjunction with the seat cushion, and wherein when the arm is in the second position, the mattress extends from a front end of the ottoman to the seat cushion.

18. The in-vehicle bed assembly of claim 17, wherein: the platform includes a flat surface; the mattress is further configured to be detached from the platform; and
wherein the arm is rotatable to a third position between the first position and the second position, and in the third position the platform is above the seat cushion with the flat surface of the platform parallel to a floor of the vehicle.

* * * * *